United States Patent
Graziosi et al.

(10) Patent No.: US 10,878,597 B2
(45) Date of Patent: Dec. 29, 2020

(54) RATE DISTORTION OPTIMIZATION FOR ADAPTIVE SUBBAND CODING OF REGIONAL ADAPTIVE HAAR TRANSFORM (RAHT)

(71) Applicant: SONY CORPORATION, Tokyo (JP)

(72) Inventors: Danillo Graziosi, San Jose, CA (US); Arash Vosoughi, San Jose, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/266,340

(22) Filed: Feb. 4, 2019

(65) Prior Publication Data

US 2020/0090374 A1   Mar. 19, 2020

Related U.S. Application Data

(60) Provisional application No. 62/731,597, filed on Sep. 14, 2018.

(51) Int. Cl.
*G06T 9/40* (2006.01)
*G06T 19/20* (2011.01)

(52) U.S. Cl.
CPC .............. *G06T 9/40* (2013.01); *G06T 19/20* (2013.01); *G06T 2219/2012* (2013.01)

(58) Field of Classification Search
CPC .... G06T 9/40; G06T 19/20; G06T 2219/2012
See application file for complete search history.

(56) References Cited

U.S. PATENT DOCUMENTS

| | | | |
|---|---|---|---|
| 10,262,451 B1* | 4/2019 | Chou | G06T 15/10 |
| 10,496,336 B2* | 12/2019 | Hemmer | H03M 7/405 |
| 2005/0002573 A1* | 1/2005 | Joshi | H04N 19/147 382/232 |
| 2008/0225947 A1* | 9/2008 | Narroschke | H04N 19/129 375/240.12 |
| 2010/0189180 A1* | 7/2010 | Narroschke | H04N 19/147 375/240.16 |
| 2011/0038410 A1* | 2/2011 | Narroschke | H04N 19/167 375/240.03 |
| 2017/0347100 A1 | 11/2017 | Chou et al. | |
| 2017/0347120 A1 | 11/2017 | Chou et al. | |

(Continued)

OTHER PUBLICATIONS

Daribo, Ismael, "Efficient Rate-Distortion Compression of Dynamic Point Cloud for Grid-Pattern Based 3D Scanning Systems", 3D Research Center, Kwangwoon University,Oct. 10, 2011.

(Continued)

*Primary Examiner* — Abderrahim Merouan
(74) *Attorney, Agent, or Firm* — Haverstock & Owens LLP

(57) ABSTRACT

A method for rate distortion optimization for adaptive subband coding of Region-Adaptive Hierarchical Transform (RAHT) coefficients, which is a point cloud color compression method adopted in PCC test model TMC13 for compression of CAT1 sequences is described herein. Based on Lagrangian optimization, the method estimates the coefficient distortion by using the compressed mesh geometry as reference. The Lagrange factor is calculated based on the quantization parameters, and the results show that the parameters obtained automatically have similar or better performance than parameters chosen after an extensive search.

21 Claims, 2 Drawing Sheets

(56) References Cited

U.S. PATENT DOCUMENTS

2017/0347122 A1* 11/2017 Chou .................... H04N 19/60

OTHER PUBLICATIONS

The International Search Report and Written Opinion of the International Searching Authority, or the Declaration for PCT Application No. PCT/IB2019/057165 dated Jan. 10, 2020.
Arash Vosoughi (Sony) et al., "TMC13 Sub-band Adaptive Coding for RAHT", 123. MPEG Meeting; Jul. 16, 2018-Jul. 20, 2018; Ljabljana; (Motion Picture Expert Group or ISO/IEC JTC1/SC29/WG11), No. m43656 Jul. 12, 2018 (Jul. 12, 2018), XP030197007, Retrieved from the Internet: URL:http://phenix.int-evry.fr/mpeg/doc_end_user/documents/123_Ljubljana/wg11/m43656-v1-m43656.zip m43656-v1.docx [retrieved on Jul. 12, 2018].
Sullivan G J; Wiegand T: "Rate-distortion optimization for video compression", IEEE Signal Processing Magazine., vol. 15, No. 6, Nov. 1, 1998 (Nov. 1, 1998), pp. 74-90, XP055480988, US ISSN: 1056-5888, DOI: 10.1109/79.733497.
Julius Kammerl et al.,"Real-trime compression of point cloud streams", Robotics and Automation (ICRA), 2012 IEEE International Conference on, IEEE, May 14, 2012 (May 14, 2012), pp. 778-785, XP032450378, DOI: 10.1109/icra.2012.6224647, ISBN: 978-4673-1403-9.
De Queiroz Ricardo L et al., "Compression of 3D Point Clouds Using a Region-Adaptive Hierarchical Transform", IEEE Transactions on Image Processing, IEEE Service Center, Piscataway, NJ, US, vol. 25, No. 8 Aug. 1, 2016 (Aug. 1, 2016), pp. 3947-3956 XP011615540, ISSN: 1057-7149, DOI: 10.1109/TIP.2016.2575005 [retrieved on Jun. 29, 2016].

* cited by examiner

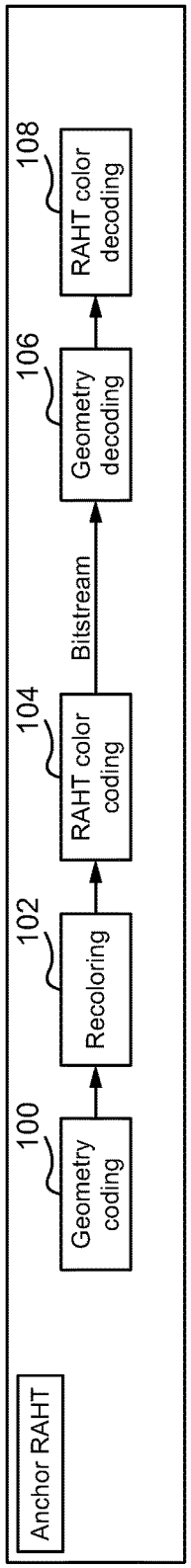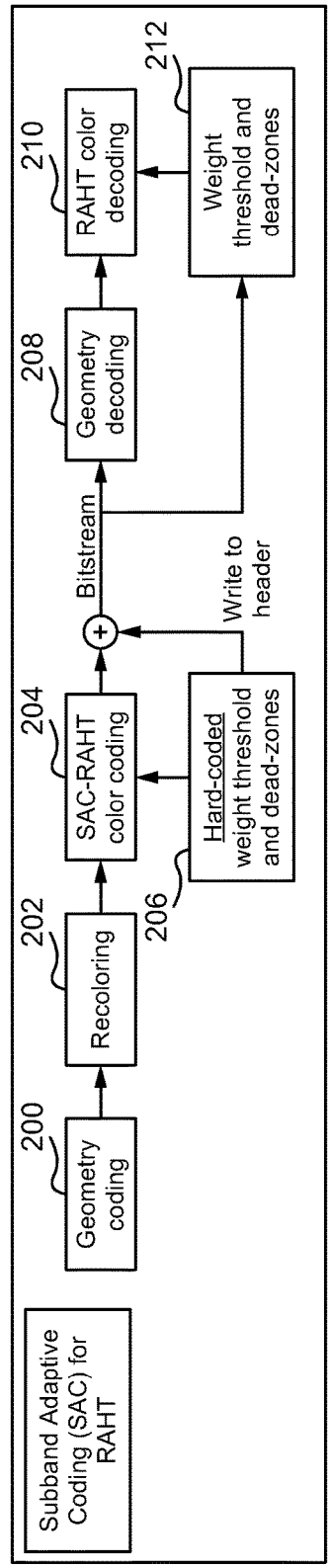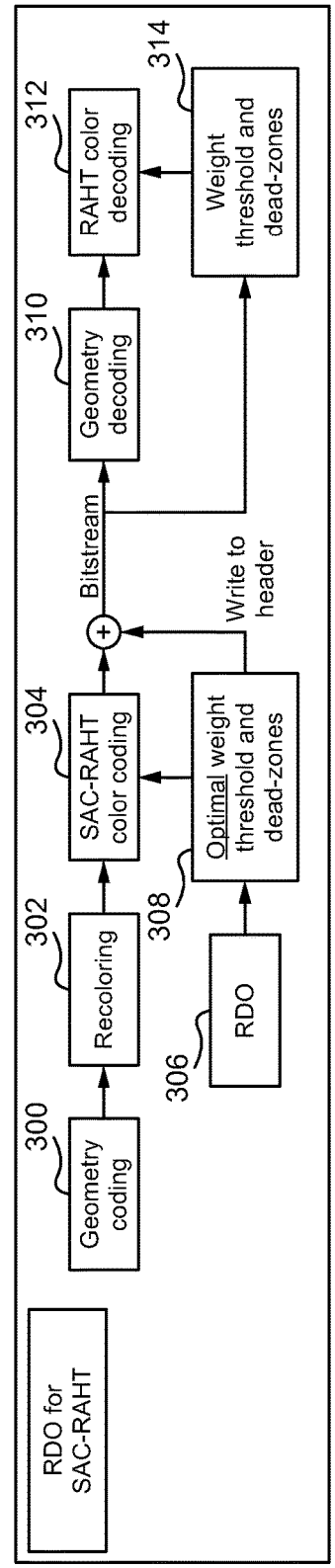

RATE DISTORTION OPTIMIZATION FOR ADAPTIVE SUBBAND CODING OF REGIONAL ADAPTIVE HAAR TRANSFORM (RAHT)

CROSS-REFERENCE TO RELATED APPLICATION(S)

This application claims priority under 35 U.S.C. § 119(e) of the U.S. Provisional Patent Application Ser. No. 62/731, 597, filed Sep. 14, 2018 and titled, "RATE DISTORTION OPTIMIZATION FOR ADAPTIVE SUBBAND CODING OF REGIONAL ADAPTIVE HAAR TRANSFORM (RAHT)," which is hereby incorporated by reference in its entirety for all purposes.

FIELD OF THE INVENTION

The present invention relates to three dimensional graphics. More specifically, the present invention relates to compression of three dimensional graphics.

BACKGROUND OF THE INVENTION

RAHT is a transform for color compression of point clouds and has been adopted in one of MPEG test models. However, the performance of RAHT could be improved.

SUMMARY OF THE INVENTION

A method for rate distortion optimization for adaptive sub-band coding of Region-Adaptive Hierarchical Transform (RAHT) coefficients, which is a point cloud color compression method adopted in PCC test model TMC13 for compression of CAT1 sequences is described herein. Based on Lagrangian optimization, the method estimates the coefficient distortion by using the compressed mesh geometry as reference. The Lagrange factor is calculated based on the quantization parameters, and the results show that the parameters obtained automatically have similar or better performance than parameters chosen after an extensive search.

In one aspect, a method programmed in a non-transitory memory of a device comprises implementing geometry coding, performing recoloring including transferring coloring from a first point cloud to a second point cloud, implementing Subband Adaptive Coding (SAC)-Region-Adaptive Hierarchical Transform (RAHT) color coding to transmit a bitstream and utilizing Rate Distortion Optimization (RDO) to determine optimal weight thresholds and dead-zones to be used for the SAC-RAHT color coding. Implementing geometry coding is based on an octree implementation. The first point cloud comprises a reference point cloud, and the second point cloud comprises a reconstructed point cloud. SAC-RAHT color coding includes performing operations on the color to generate high frequency values and low frequency values. The optimal weight thresholds and dead-zones are written to a header of the bitstream. The method further comprises decoding the geometry. The method further comprises implementing RAHT color decoding utilizing the optimal weight thresholds and dead-zones which are received from the header of the bitstream.

In another aspect, an apparatus comprises a non-transitory memory for storing an application, the application for: implementing geometry coding, performing recoloring including transferring coloring from a first point cloud to a second point cloud, implementing Subband Adaptive Coding (SAC)-Region-Adaptive Hierarchical Transform (RAHT) color coding to transmit a bitstream and utilizing Rate Distortion Optimization (RDO) to determine optimal weight thresholds and dead-zones to be used for the SAC-RAHT color coding and a processor coupled to the memory, the processor configured for processing the application. Implementing geometry coding is based on an octree implementation. The first point cloud comprises a reference point cloud, and the second point cloud comprises a reconstructed point cloud. SAC-RAHT color coding includes performing operations on the color to generate high frequency values and low frequency values. The optimal weight thresholds and dead-zones are written to a header of the bitstream. The application is further configured for decoding the geometry. The application is further configured for implementing RAHT color decoding utilizing the optimal weight thresholds and dead-zones which are received from the header of the bitstream.

In another aspect, a system comprises a coding module configured for implementing geometry coding, a recoloring module configured for performing recoloring including transferring coloring from a first point cloud to a second point cloud, a color coding module configured for implementing Subband Adaptive Coding (SAC)-Region-Adaptive Hierarchical Transform (RAHT) color coding to transmit a bitstream and an RDO module configured for utilizing Rate Distortion Optimization (RDO) to determine optimal weight thresholds and dead-zones to be used for the SAC-RAHT color coding. Implementing geometry coding is based on an octree implementation. The first point cloud comprises a reference point cloud, and the second point cloud comprises a reconstructed point cloud. SAC-RAHT color coding includes performing operations on the color to generate high frequency values and low frequency values. The optimal weight thresholds and dead-zones are written to a header of the bitstream. The system further comprises a decoding module configured for decoding the geometry. The system further comprises a color decoding module configured for implementing RAHT color decoding utilizing the optimal weight thresholds and dead-zones which are received from the header of the bitstream.

BRIEF DESCRIPTION OF THE DRAWINGS

FIG. 1 illustrates a flowchart of a method of implementing Anchor RAHT according to some embodiments.

FIG. 2 illustrates a flowchart of a method of implementing Subband Adaptive Coding (SAC) for RAHT according to some embodiments.

FIG. 3 illustrates a flowchart of a method of implementing RDO for SAC-RAHT according to some embodiments.

DETAILED DESCRIPTION OF THE PREFERRED EMBODIMENT

Figure 4:
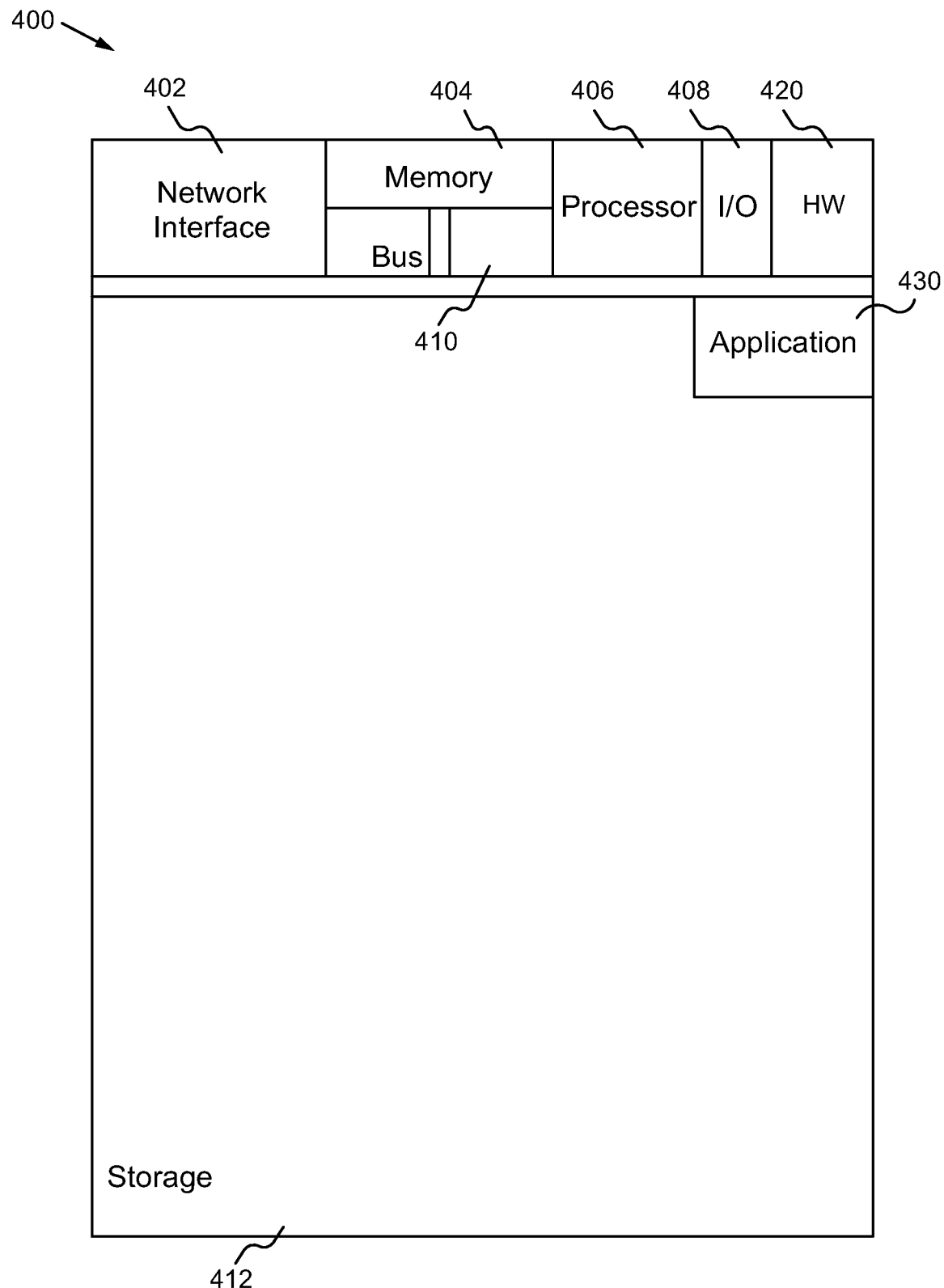
FIG. 4 illustrates a block diagram of an exemplary computing device configured to implement the RDO adaptive subband coding method according to some embodiments.

A method for rate distortion optimization for adaptive sub-band coding of Region-Adaptive Hierarchical (or HAAR) Transform (RAHT) coefficients, which is a point cloud color compression method adopted in Point Cloud Compression (PCC) test model TMC13 for compression of CAT1 sequences is described herein. Based on Lagrangian optimization, the method estimates the coefficient distortion by using the compressed mesh geometry as reference. The Lagrange factor is calculated based on the quantization parameters, and the results show that the parameters obtained automatically have similar or better performance than parameters chosen after an extensive search.

A method to automatically determine the set of parameters used for adaptive sub-band coding to achieve the optimal rate-distortion point is described herein.

Once geometries are encoded and decoded, there are reference geometries. Then, recoloring is implemented which is transferring the coloring from one point cloud to another point cloud (e.g., the reference point cloud to a reconstructed point cloud). Then, RAHT is applied to the color of the reconstructed point cloud. The RAHT performs operations on the color to generate high frequency values, low frequency values, spectral decomposition and/or other values which are used to compress the point cloud color information. The coefficients of the transform are then quantized, entropy coded and transmitted (e.g., compressed). In some embodiments, a "smart" quantization is implemented. For example, values below a threshold (e.g., values from 0 to 5) are quantized to 0. In some embodiments, the quantizing is performed on a sub-band. A set of weights are able to be applied to the coefficients. For example, a weight of 3 means that there are 3 neighbors close to a point, and with the RAHT, all of the neighbors are added to the point. Based on the weight of a point, it is able to be determined if the point is in a high frequency band or a low frequency band. Then, different dead zones are applied depending on which band the coefficient is located in. Using a threshold enables the method to be efficient by eliminating a lot of unnecessary information. Determining an optimal threshold (dead zone value) is able to be based on a Rate Distortion Optimization (RDO) scheme.

FIG. 1 illustrates a flowchart of a method of implementing Anchor RAHT according to some embodiments. In the step 100, geometry coding is implemented. Geometry coding is able to include any implementation of geometry coding such as geometry coding based on an octree implementation related to TMC13. In the step 102, recoloring is implemented. Recoloring is able to include any implementation of recoloring such as transferring the coloring from one point cloud to another point cloud (e.g., the reference point cloud to a reconstructed point cloud). In the step 104, RAHT color coding is implemented to transmit a bitstream. RAHT color coding includes performing operations on the color to generate high frequency values, low frequency values, spectral decomposition and others. In the step 106, the geometry is decoded, and in the step 108, RAHT color decoding is implemented. In some embodiments, fewer or additional steps are implemented. In some embodiments, the order of the steps is modified.

FIG. 2 illustrates a flowchart of a method of implementing Subband Adaptive Coding (SAC) for RAHT according to some embodiments. In the step 200, geometry coding is implemented. Geometry coding is able to include any implementation of geometry coding such as geometry coding based on an octree implementation related to TMC13. In the step 202, recoloring is implemented. Recoloring is able to include any implementation of recoloring such as transferring the coloring from one point cloud to another point cloud (e.g., the reference point cloud to a reconstructed point cloud). In the step 204, SAC-RAHT color coding is implemented to transmit a bitstream. SAC-RAHT color coding includes performing operations on the color to generate high frequency values, low frequency values, spectral decomposition and others. In the step 206, hard-coded weight thresholds and dead-zones are used for the SAC-RAHT color coding which are also written to the header of the bitstream.

In the step 208, the geometry is decoded, and in the step 210, RAHT color decoding is implemented. The RAHT color decoding utilizes weight thresholds and dead-zones from the step 212 which are received from the header of the bitstream. In some embodiments, fewer or additional steps are implemented. In some embodiments, the order of the steps is modified.

FIG. 3 illustrates a flowchart of a method of implementing RDO for SAC-RAHT according to some embodiments. In the step 300, geometry coding is implemented. Geometry coding is able to include any implementation of geometry coding such as geometry coding based on an octree implementation related to TMC13. In the step 302, recoloring is implemented. Recoloring is able to include any implementation of recoloring such as transferring the coloring from one point cloud to another point cloud (e.g., the reference point cloud to a reconstructed point cloud). In the step 304, SAC-RAHT color coding is implemented to transmit a bitstream. SAC-RAHT color coding includes performing operations on the color to generate high frequency values, low frequency values, spectral decomposition and others. In the step 306, RDO is implemented to determine optimal weight thresholds and dead-zones. In the step 308, the optimal weight thresholds and dead-zones are used for the SAC-RAHT color coding which are also written to the header of the bitstream. In the step 310, the geometry is decoded, and in the step 312, RAHT color decoding is implemented. The RAHT color decoding utilizes the optimal weight thresholds and dead-zones from the step 314 which are received from the header of the bitstream. In some embodiments, fewer or additional steps are implemented. In some embodiments, the order of the steps is modified.

Exemplary code includes:

```
#Encoder
#----Adaptive Subband Coding----
enc_cmd - tmc13_path + \
    -mode =2 + \
    -colorTransorm =1 ' + \
    -transformType = 1 ' + \
    -rahtQuantizationStep = ' + str(rahtQuantizationStep) + \
    -rahtleafDeterminationDepth=0 ' + \
    -rahtEnableRDO ' + str (enable_RDO * 1) + \
    -rahtLagrangianConstant = ' + str(rahtLagrangianConstant) + \
    -rahtRdoWeightThreshold = "10 13 15" ' + \
    -rahtRdoDeadzone Y = 1 1 1 2 2 2 3" ' + \
    -rahtRdoDeadzone U = 2 3 4 2 3 4 4" ' + \
    -rahtRdoDeadzone V = 2 3 4 2 3 4 4" ' + \
    -rahtRdoParamPath = ' + rahtRdoParamPath + \
    -attribute = ' + attr_type + " " + \
    -uncompressedDataPath = ' + uncompressedDataPath + \
    -compressedStreamPath = ' + compressedStreamPath + \
    > ' + encoderLogPath
```

The 21 coding options are evaluated in the RDO loop in the code, and the one that minimizes:

$$J = D + \lambda R,$$

is the one that is selected as the optimal coding option, where J is the cost function, which is defined as the distortion (D) plus lambda times the rate (R). This is a common function in video coding to achieve a desired distortion with a reasonable rate, where several parameters are chosen to minimize the above cost function. Lambda is a variable that weights the distortion against the rate, and is related to the quantization parameter as described herein.

$$\theta^* = \arg\min_{\theta \in \Theta} D(\theta) + \lambda(\text{step\_size})R(\theta)$$

where θ* is the optimal coding option, Θ represents the 21 coding options, θ is a coding option. This equation is similar to the equation above, but this equation shows the coding options (theta) and the relation between distortion D, rate R and lambda. To determine D, a fast estimation of D is able to be determined by computing a Sum of Absolute Differences (SAD) between a recolored (uncoded) cloud and a reconstructed cloud. Only one pass of RAHT forward transform is applied. For each coding option, inverse RAHT transform is computed once to derive the reconstructed cloud.

$$D = \frac{\frac{2}{N}\sum_{i=1}^{N} |c_i^{recolored,Y} - c_i^{rec,Y}| + \frac{1}{N}\sum_{i=1}^{N} |c_i^{recolored,U} - c_i^{rec,U}| + \frac{1}{N}\sum_{i=1}^{N} |c_i^{recolored,V} - c_i^{rec,V}|}{4}$$

The Lagrangian multiplier is:

$$\lambda = 0.001 \times step\_size^2$$

Constant 0.0001 is obtained by optimization over $\{2\times10^{-4}, 4\times10^{-4}, 8\times10^{-4}, 10^{-3}, 2\times10^{-3}, 4\times10^{-3}, 8\times10^{-3}\}$.

FIG. 4 illustrates a block diagram of an exemplary computing device configured to implement the RDO adaptive subband coding method according to some embodiments. The computing device 400 is able to be used to acquire, store, compute, process, communicate and/or display information such as images and videos including 3D content. The computing device 400 is able to implement any of the RDO adaptive subband coding method aspects. In general, a hardware structure suitable for implementing the computing device 400 includes a network interface 402, a memory 404, a processor 406, I/O device(s) 408, a bus 410 and a storage device 412. The choice of processor is not critical as long as a suitable processor with sufficient speed is chosen. The memory 404 is able to be any conventional computer memory known in the art. The storage device 412 is able to include a hard drive, CDROM, CDRW, DVD, DVDRW, High Definition disc/drive, ultra-HD drive, flash memory card or any other storage device. The computing device 400 is able to include one or more network interfaces 402. An example of a network interface includes a network card connected to an Ethernet or other type of LAN. The I/O device(s) 408 are able to include one or more of the following: keyboard, mouse, monitor, screen, printer, modem, touchscreen, button interface and other devices. RDO adaptive subband coding application(s) 430 used to implement the RDO adaptive subband coding method are likely to be stored in the storage device 412 and memory 404 and processed as applications are typically processed. More or fewer components shown in FIG. 4 are able to be included in the computing device 400. In some embodiments, RDO adaptive subband coding hardware 420 is included. Although the computing device 400 in FIG. 4 includes applications 430 and hardware 420 for the RDO adaptive subband coding method, the RDO adaptive subband coding method is able to be implemented on a computing device in hardware, firmware, software or any combination thereof. For example, in some embodiments, the RDO adaptive subband coding applications 430 are programmed in a memory and executed using a processor. In another example, in some embodiments, the RDO adaptive subband coding hardware 420 is programmed hardware logic including gates specifically designed to implement the RDO adaptive subband coding method.

In some embodiments, the RDO adaptive subband coding application(s) 430 include several applications and/or modules. In some embodiments, modules include one or more sub-modules as well. In some embodiments, fewer or additional modules are able to be included.

In some embodiments, the RDO adaptive subband coding hardware 420 includes camera components such as a lens, an image sensor, and/or any other camera components.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

To utilize the RDO adaptive subband coding method described herein, a device acquires or receives 3D content and processes and/or sends the content in an optimized manner to enable proper, efficient display of the 3D content. The RDO adaptive subband coding method is able to be implemented with user assistance or automatically without user involvement.

In operation, the RDO adaptive subband coding method more efficiently processes 3D content including compressing the data such that much less information is sent.

Some Embodiments of Rate Distortion Optimization for Adaptive Subband Coding of Regional Adaptive HAAR Transform (RAHT)

1. A method programmed in a non-transitory memory of a device comprising:
    implementing geometry coding;
    performing recoloring including transferring coloring from a first point cloud to a second point cloud;
    implementing Subband Adaptive Coding (SAC)-Region-Adaptive Hierarchical Transform (RAHT) color coding to transmit a bitstream; and
    utilizing Rate Distortion Optimization (RDO) to determine optimal weight thresholds and dead-zones to be used for the SAC-RAHT color coding.
2. The method of clause 1 wherein implementing geometry coding is based on an octree implementation.
3. The method of clause 1 wherein the first point cloud comprises a reference point cloud, and the second point cloud comprises a reconstructed point cloud.
4. The method of clause 1 wherein SAC-RAHT color coding includes performing operations on the color to generate high frequency values and low frequency values.
5. The method of clause 1 wherein the optimal weight thresholds and dead-zones are written to a header of the bitstream.
6. The method of clause 1 further comprising decoding the geometry.
7. The method of clause 1 further comprising implementing RAHT color decoding utilizing the optimal weight thresholds and dead-zones which are received from the header of the bitstream.
8. An apparatus comprising:
    a non-transitory memory for storing an application, the application for:
    implementing geometry coding;

performing recoloring including transferring coloring from a first point cloud to a second point cloud;
implementing Subband Adaptive Coding (SAC)-Region-Adaptive Hierarchical Transform (RAHT) color coding to transmit a bitstream; and
utilizing Rate Distortion Optimization (RDO) to determine optimal weight thresholds and dead-zones to be used for the SAC-RAHT color coding; and
a processor coupled to the memory, the processor configured for processing the application.

9. The apparatus of clause 8 wherein implementing geometry coding is based on an octree implementation.

10. The apparatus of clause 8 wherein the first point cloud comprises a reference point cloud, and the second point cloud comprises a reconstructed point cloud.

11. The apparatus of clause 8 wherein SAC-RAHT color coding includes performing operations on the color to generate high frequency values and low frequency values.

12. The apparatus of clause 8 wherein the optimal weight thresholds and dead-zones are written to a header of the bitstream.

13. The apparatus of clause 8 wherein the application is further configured for decoding the geometry.

14. The apparatus of clause 8 wherein the application is further configured for implementing RAHT color decoding utilizing the optimal weight thresholds and dead-zones which are received from the header of the bitstream.

15. A system comprising:
a coding module configured for implementing geometry coding;
a recoloring module configured for performing recoloring including transferring coloring from a first point cloud to a second point cloud;
a color coding module configured for implementing Subband Adaptive Coding (SAC)-Region-Adaptive Hierarchical Transform (RAHT) color coding to transmit a bitstream; and
an RDO module configured for utilizing Rate Distortion Optimization (RDO) to determine optimal weight thresholds and dead-zones to be used for the SAC-RAHT color coding.

16. The system of clause 15 wherein implementing geometry coding is based on an octree implementation.

17. The system of clause 15 wherein the first point cloud comprises a reference point cloud, and the second point cloud comprises a reconstructed point cloud.

18. The system of clause 15 wherein SAC-RAHT color coding includes performing operations on the color to generate high frequency values and low frequency values.

19. The system of clause 15 wherein the optimal weight thresholds and dead-zones are written to a header of the bitstream.

20. The system of clause 15 further comprising a decoding module configured for decoding the geometry.

21. The system of clause 15 further comprising a color decoding module configured for implementing RAHT color decoding utilizing the optimal weight thresholds and dead-zones which are received from the header of the bitstream.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device comprising:
implementing geometry coding;
performing recoloring including transferring coloring from a first point cloud to a second point cloud;
implementing Subband Adaptive Coding (SAC)-Region-Adaptive Hierarchical Transform (RAHT) color coding to transmit a bitstream;
utilizing Rate Distortion Optimization (RDO) to determine optimal weight thresholds and dead-zones to be used for the SAC-RAHT color coding; and
estimating coefficient distortion of the coefficients of the SAC-RAHT based on Lagrangian optimization using a compressed geometry as a reference, wherein a Lagrange factor is calculated based on quantization parameters of the SAC-RAHT.

2. The method of claim 1 wherein implementing geometry coding is based on an octree implementation.

3. The method of claim 1 wherein the first point cloud comprises a reference point cloud, and the second point cloud comprises a reconstructed point cloud.

4. The method of claim 1 wherein SAC-RAHT color coding includes performing operations on the color to generate high frequency values and low frequency values.

5. The method of claim 1 wherein the optimal weight thresholds and dead-zones are written to a header of the bitstream.

6. The method of claim 1 further comprising decoding the geometry.

7. The method of claim 1 further comprising implementing RAHT color decoding utilizing the optimal weight thresholds and dead-zones which are received from the header of the bitstream.

8. An apparatus comprising: a non-transitory memory for storing an application, the application for:
implementing geometry coding;
performing recoloring including transferring coloring from a first point cloud to a second point cloud;
implementing Subband Adaptive Coding (SAC)-Region-Adaptive Hierarchical Transform (RAHT) color coding to transmit a bitstream;
utilizing Rate Distortion Optimization (RDO) to determine optimal weight thresholds and dead-zones to be used for the SAC-RAHT color coding; and a processor coupled to the memory, the processor configured for processing the application; and
estimating coefficient distortion of the coefficients of the SAC-RAHT based on Lagrangian optimization using a compressed geometry as a reference, wherein a Lagrange factor is calculated based on quantization parameters of the SAC-RAHT.

9. The apparatus of claim 8 wherein implementing geometry coding is based on an octree implementation.

10. The apparatus of claim 8 wherein the first point cloud comprises a reference point cloud, and the second point cloud comprises a reconstructed point cloud.

11. The apparatus of claim 8 wherein SAC-RAHT color coding includes performing operations on the color to generate high frequency values and low frequency values.

12. The apparatus of claim 8 wherein the optimal weight thresholds and dead-zones are written to a header of the bitstream.

13. The apparatus of claim 8 wherein the application is further configured for decoding the geometry.

14. The apparatus of claim 8 wherein the application is further configured for implementing RAHT color decoding utilizing the optimal weight thresholds and dead-zones which are received from the header of the bitstream.

15. A system comprising:
   a coding module configured for implementing geometry coding;
   a recoloring module configured for performing recoloring including transferring coloring from a first point cloud to a second point cloud;
   a color coding module configured for implementing Subband Adaptive Coding (SAC)-Region-Adaptive Hierarchical Transform (RAHT) color coding to transmit a bitstream;
   an RDO module configured for utilizing Rate Distortion Optimization (RDO) to determine optimal weight thresholds and dead-zones to be used for the SAC-RAHT color coding; and
   estimating coefficient distortion of the coefficients of the SAC-RAHT based on Lagrangian optimization using a compressed geometry as a reference, wherein a Lagrange factor is calculated based on quantization parameters of the SAC-RAHT.

16. The system of claim 15 wherein implementing geometry coding is based on an octree implementation.

17. The system of claim 15 wherein the first point cloud comprises a reference point cloud, and the second point cloud comprises a reconstructed point cloud.

18. The system of claim 15 wherein SAC-RAHT color coding includes performing operations on the color to generate high frequency values and low frequency values.

19. The system of claim 15 wherein the optimal weight thresholds and dead-zones are written to a header of the bitstream.

20. The system of claim 15 further comprising a decoding module configured for decoding the geometry.

21. The system of claim 15 further comprising a color decoding module configured for implementing RAHT color decoding utilizing the optimal weight thresholds and dead-zones which are received from the header of the bitstream.

* * * * *